(12) United States Patent
Demirdjian et al.

(10) Patent No.: US 11,203,116 B2
(45) Date of Patent: Dec. 21, 2021

(54) SYSTEM AND METHOD FOR PREDICTING ROBOTIC TASKS WITH DEEP LEARNING

(71) Applicant: Teradyne, Inc., North Reading, MA (US)

(72) Inventors: David Demirdjian, Boca Raton, FL (US); Eric Lenhart Truebenbach, Sudbury, MA (US)

(73) Assignee: TERADYNE, INC., North Reading, MA (US)

( * ) Notice: Subject to any disclaimer, the term of this patent is extended or adjusted under 35 U.S.C. 154(b) by 217 days.

(21) Appl. No.: 16/530,344

(22) Filed: Aug. 2, 2019

(65) Prior Publication Data
US 2021/0031365 A1 Feb. 4, 2021

(51) Int. Cl.
*B25J 9/16* (2006.01)
(52) U.S. Cl.
CPC ..... *B25J 9/163* (2013.01); *G05B 2219/41054* (2013.01); *G05B 2219/50391* (2013.01)
(58) Field of Classification Search
CPC .......... B25J 9/163; G05B 2219/41054; G05B 2219/50391
See application file for complete search history.

(56) References Cited

U.S. PATENT DOCUMENTS

| | | | | |
|---|---|---|---|---|
| 9,669,543 | B1 * | 6/2017 | Stubbs | H05K 999/99 |
| 10,864,631 | B2 * | 12/2020 | Davidson | B25J 9/161 |
| 10,926,408 | B1 * | 2/2021 | Vogelsong | B25J 9/1671 |
| 2018/0250826 | A1 * | 9/2018 | Jiang | G06K 9/6256 |
| 2020/0061811 | A1 * | 2/2020 | Iqbal | B25J 9/161 |
| 2020/0147798 | A1 * | 5/2020 | Toris | B25J 9/1661 |
| 2020/0311956 | A1 * | 10/2020 | Choi | B25J 9/1697 |
| 2020/0319627 | A1 * | 10/2020 | Edwards | G05B 19/4183 |
| 2021/0023711 | A1 * | 1/2021 | Lee | B25J 9/1697 |
| 2021/0031367 | A1 * | 2/2021 | Mirzaei | G05D 1/0246 |

* cited by examiner

*Primary Examiner* — Khoi H Tran
*Assistant Examiner* — Tristan J Greiner
(74) *Attorney, Agent, or Firm* — Mark H. Whittenberger; Holland & Knight LLP

(57) ABSTRACT

A computing system is provided for training one or more machine learning models to perform at least a portion of a robotic task of a physical robotic system by monitoring a model-based control algorithm associated with the physical robotic system perform at least a portion of the robotic task. One or more robotic task predictions may be defined, via the one or more machine learning models, based upon, at least in part, the training of the one or more machine learning models. The one or more robotic task predictions may be provided to the model-based control algorithm associated with the physical robotic system. The robotic task may be performed, via the model-based control algorithm associated with the robotic system, on the physical robotic system based upon, at least in part, the one or more robotic task predictions defined by the one or more machine learning models.

25 Claims, 10 Drawing Sheets

SYSTEM AND METHOD FOR PREDICTING ROBOTIC TASKS WITH DEEP LEARNING

FIELD OF THE INVENTION

The invention generally relates to robotics and more specifically to a system and method for predicting robotic tasks with deep learning.

BACKGROUND

Many robotic systems are programmed for specific tasks requiring the physical robotic system to perform certain automated object recognition and object handling operations. A physical robotic system may generally be programmed or controlled by a model-based control algorithm to perform a robotic task such as a robotic "pick-and-place process" or "bin-picking process" configured to identify objects in a bin, grasp the object, remove the object from the bin, and place the object somewhere outside of the bin. In bin-picking for instance, finding a valid part in a bin involves multiple steps (e.g., region of interest ("ROI") estimation, part matching, part validation) where each step may be repeated multiple times.

Deep learning has been introduced to improve operations of many kinds of systems by training a neural network. The fundamental problem with using a neural network-based control system is the training of the network. For example, a neural network may be trained through "supervised training" where the neural network is trained from examples (e.g., large hand-annotated data sets, such as ImageNet or GraspNet or simulations). These data sets require many man-years to create, and even then, may not contain the right kind of information for the deep learning task at hand. These data sets are also necessarily human-selected, and humans may unknowingly select an incomplete set of data. A neural network may also be trained by allowing it to operate on its own, detecting when there is an error, and trying again. This is impractical in real-life situations, where an error may result in damage to the process equipment or the product being processed.

More recently, neural networks have been trained using simulations. These are artificial representations of the task the system needs to learn, generally by modeling the task and its environment, and adding randomness to the elements of the simulation. This overcomes the time or damage limitations of real-life training, but at the cost of less learning about all variations. For example, supervised training with simulations is limited in that a human needs to specify the parameters to vary, and in that, the representation of the task and environment is necessarily simplified. A human-specified variation may fail to encompass all of the possible real-world variations, and a simplified simulation may remove critical data through simplification.

Accordingly, all of these methods are still limited by a human's familiarity with the task to be performed and the variations it may encompass. These methods are further limited by the realism of a simulation or the breadth of a data set. For this reason and others, neural networks currently do not perform as well as human-devised process controllers, generally achieving no more than an 87% success rate for the task at hand compared to the human-devised process controllers.

SUMMARY

In one implementation, a computing system including a processor and memory configured to perform operations including, but not limited to, training one or more machine learning models to perform at least a portion of a robotic task of a physical robotic system by monitoring a model-based control algorithm associated with the physical robotic system perform at least a portion of the robotic task. One or more robotic task predictions may be defined, via the one or more machine learning models, based upon, at least in part, the training of the one or more machine learning models. The one or more robotic task predictions may be provided to the model-based control algorithm associated with the physical robotic system. The robotic task may be performed, via the model-based control algorithm associated with the robotic system, on the physical robotic system based upon, at least in part, the one or more robotic task predictions defined by the one or more machine learning models.

One or more of the following features may be included. The robotic task may include picking at least one object from a bin. Defining, via the one or more machine learning models, the one or more robotic task predictions may include identifying, via a first machine learning model, a location of one or more pickable regions in the at least a portion of a bin. Providing the one or more robotic task predictions to the model-based control algorithm may include providing the location of the one or more pickable regions in the at least a portion of the bin to the model-based control algorithm. Performing, via the model-based control algorithm associated with the robotic system, the robotic task on the physical robotic system based upon, at least in part, the one or more robotic task predictions defined by the one or more machine learning models may include selecting, via the model-based control algorithm, a region of interest based upon, at least in part, the location of the one or more pickable regions in the at least a portion of the bin. Training the one or more machine learning models to perform the at least a portion of the robotic task of the physical robotic system by monitoring the model-based control algorithm associated with the physical robotic system perform the at least a portion of the robotic task may include identifying, via the model-based control algorithm, one or more objects within the selected region of interest, thus defining one or more identified objects, scoring, via the model-based control algorithm, the one or more identified objects using a model fitting criteria, thus defining one or more ranked objects, and performing one or more simulations to determine which of the one or more ranked objects can be picked by the physical robotic system, thus defining one or more pickable objects. A pick validation may be received from the model-based control algorithm indicating whether an identified object is valid based upon, at least in part, the one or more simulations or invalid based upon, at least in part, the scoring of the one or more identified objects. A training pair may be generated including a scanned image of the at least a portion of the bin and a corresponding heatmap indicating a location of the identified object. updating the first machine learning model based upon, at least in part, the training pair. The location of the one or more pickable regions may be provided to the model-based control algorithm after the first machine learning model is updated with a predetermined number of training pairs.

Defining, via the one or more machine learning models, the one or more robotic task predictions may include defining, via a second machine learning model, one or more object locations in the at least a portion of the bin based upon, at least in part, the scan of the least a portion of the bin. providing the one or more robotic task predictions to the model-based control algorithm may include providing the one or more object locations in the at least a portion of the bin to the model-based control algorithm. Performing, via the model-based control algorithm associated with the robotic system, the robotic task on the physical robotic system based upon, at least in part, the one or more robotic task predictions defined by the one or more machine learning models may include identifying, via the model-based control algorithm, one or more objects within the selected region of interest based upon, at least in part, the one or more object locations, thus defining one or more machine learning model-identified objects. The one or more object locations in the at least a portion of the bin may include a list of bounding boxes and a binary mask associated with the at least one object. One or more objects may be identified, via the model-based control algorithm, within the selected region of interest, thus defining one or more identified objects. updating the second machine learning model based upon, at least in part, the one or more identified objects.

Defining, via the one or more machine learning models, the one or more robotic task predictions may include generating, via a third machine learning model, a three-dimensional pose associated with the at least one object based upon, at least in part, a scan of the at least a portion of the bin and the one or more object locations in the at least a portion of the bin. A validation score may be generated, via the third machine learning model, for each three-dimensional pose associated with the at least one object. Providing the one or more object predictions to the model-based control algorithm may include providing the three-dimensional pose associated with the at least one object and the validation score for each three-dimensional pose associated with the at least one object to the model-based control algorithm. Performing, via the model-based control algorithm associated with the robotic system, the robotic task on the physical robotic system based upon, at least in part, the one or more robotic task predictions defined by the one or more machine learning models may include scoring, via the model-based control algorithm, the three dimensional pose associated with each object of the at least one object and performing one or more simulations to determine which three dimensional pose associated with the at least one object can be picked by the physical robotic system. A pick validation may be received from the model-based control algorithm based upon, at least in part, the one or more simulations. The third machine learning model may be updated based upon, at least in part, the pick validation. Picking, via the physical robotic system, an object from the at least a portion of the bin based upon, at least in part, the location of the one or more pickable regions in the at least a portion of the bin. Picking, via the physical robotic system, an object from the at least a portion of the bin based upon, at least in part, the one or more object locations. Picking, via the physical robotic system, an object from the at least a portion of the bin based upon, at least in part, the three-dimensional pose associated with the at least one object.

The details of one or more implementations are set forth in the accompanying drawings and the description below. Other features and advantages will become apparent from the description, the drawings, and the claims.

BRIEF DESCRIPTION OF THE DRAWINGS

For a better understanding of the nature and objects of the present disclosure, reference is made to the following detailed description taken in conjunction with the following drawings, in which.

DETAILED DESCRIPTION

Figure 1:
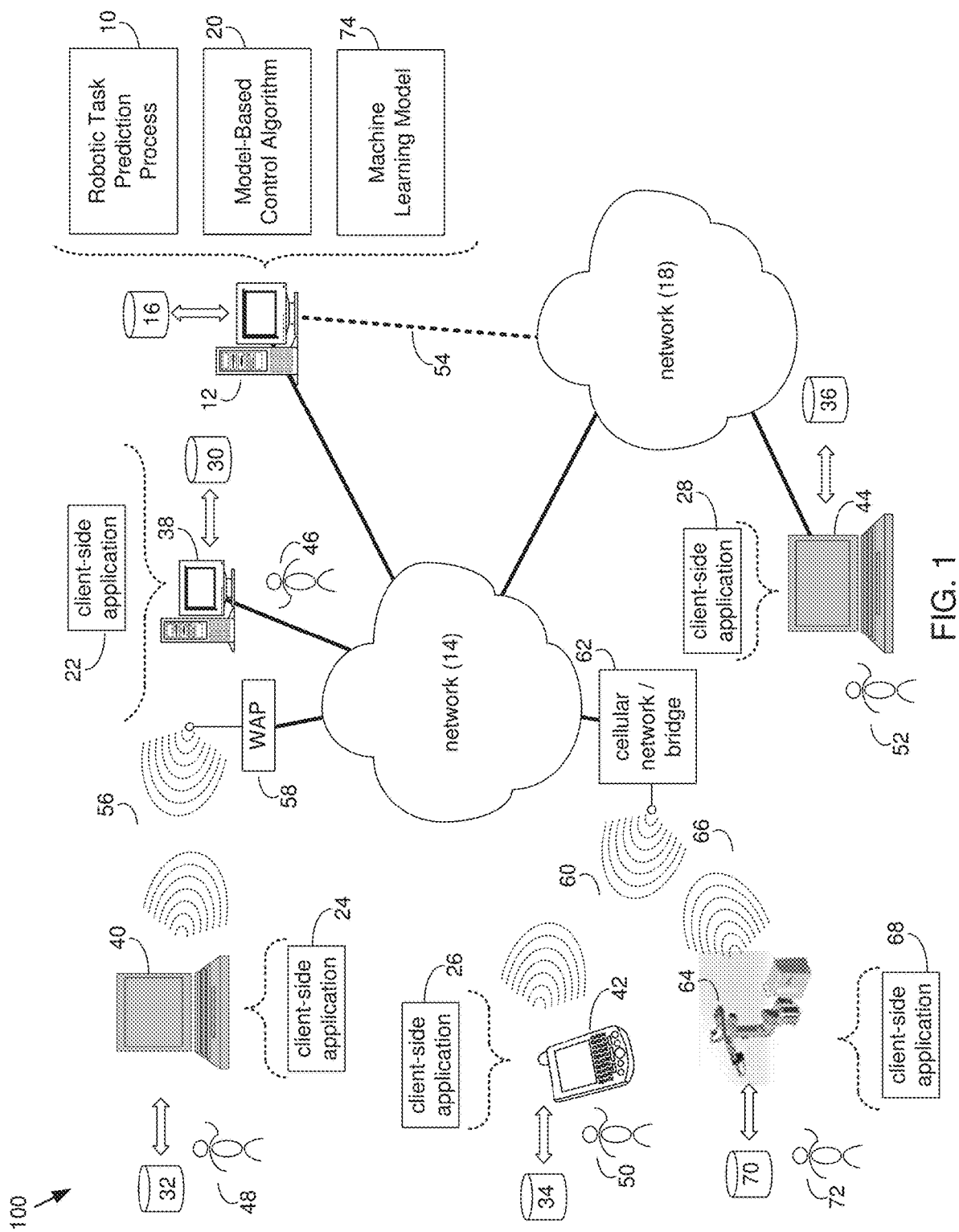
FIG. 1 is a diagrammatic view of a robotic task prediction process coupled to a distributed computing network.

Referring now to FIG. 1, there is shown robotic task prediction process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a robotic task prediction process, such as robotic task prediction process 10 of FIG. 1, may train one or more machine learning models to perform at least a portion of a robotic task of a physical robotic system by monitoring a model-based control algorithm associated with the physical robotic system perform at least a portion of the robotic task. One or more robotic task predictions may be defined based upon, at least in part, the training of the one or more machine learning models. The one or more robotic task predictions may be provided to the model-based control algorithm associated with the physical robotic system. The robotic task may be performed, via the model-based control algorithm associated with the robotic system, on the physical robotic system based upon, at least in part, the one or more robotic task predictions defined by the one or more machine learning models.

The instruction sets and subroutines of robotic task prediction process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Robotic task prediction process 10 may be a stand-alone application that interfaces with an applet/application that is accessed via client applications 22, 24, 26, 28, 66. In some embodiments, robotic task prediction process 10 may be, in whole or in part, distributed in a cloud computing topology. In this way, computing device 12 and storage device 16 may refer to multiple devices, which may also be distributed throughout network 14 and/or network 18.

Computing device 12 may execute a model-based control algorithm (e.g., robotic model-based control algorithm 20). Robotic task prediction process 10 and/or model-based control algorithm 20 may be accessed via client applications 22, 24, 26, 28, 68. Robotic task prediction process 10 may be a stand-alone application, or may be an applet/application/script/extension that may interact with and/or be executed within model-based control algorithm 20, a component of model-based control algorithm 20, and/or one or more of client applications 22, 24, 26, 28, 68. Model-based control algorithm 20 may be a stand-alone application, or may be an applet/application/script/extension that may interact with and/or be executed within robotic task prediction process 10, a component of robotic task prediction process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of robotic task prediction process 10 and/or model-based control algorithm 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of robotic task prediction process 10 (and vice versa). Accordingly, robotic task prediction process 10 may be a purely server-side application, a purely client-side application, or a hybrid server-side/client-side application that is cooperatively executed by one or more of client applications 22, 24, 26, 28, 68 and/or robotic task prediction process 10.

One or more of client applications 22, 24, 26, 28, 68 may be configured to effectuate some or all of the functionality of model-based control algorithm 20 (and vice versa). Accordingly, model-based control algorithm 20 may be a purely server-side application, a purely client-side application, or a hybrid server-side/client-side application that is cooperatively executed by one or more of client applications 22, 24, 26, 28, 68 and/or model-based control algorithm 20. As one or more of client applications 22, 24, 26, 28, 68 robotic task prediction process 10, and model-based control algorithm 20, taken singly or in any combination, may effectuate some or all of the same functionality, any description of effectuating such functionality via one or more of client applications 22, 24, 26, 28, 68 robotic task prediction process 10, model-based control algorithm 20, or combination thereof, and any described interaction(s) between one or more of client applications 22, 24, 26, 28, 68 robotic task prediction process 10, model-based control algorithm 20, or combination thereof to effectuate such functionality, should be taken as an example only and not to limit the scope of the disclosure.

Users 46, 48, 50, 52 may access computing device 12 and robotic task prediction process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Robotic task prediction process 10 may include one or more user interfaces, such as browsers and textual or graphical user interfaces, through which users 46, 48, 50, 52 may access robotic task prediction process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, physical robotic system 64 may be wirelessly coupled to network 14 via wireless communication channel 66 established between client electronic device 42 and cellular network/bridge 62, which is shown directly coupled to network 14. Storage device 70 may be coupled to physical robotic system 64 and may include but is not limited to: hard disk drives; flash drives, tape drives; optical drives; RAID arrays; random access memories (RAM); and read-only memories (ROM). User 72 may access computing device 12 and robotic task prediction process 10 (e.g., using one or more of robotic system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also to at least FIGS. 2-10, robotic task prediction process 10 may train 200 one or more machine learning models to perform at least a portion of a robotic task of a physical robotic system by monitoring a model-based control algorithm associated with the physical robotic system perform at least a portion of the robotic task. One or more robotic task predictions may be defined 202 based upon, at least in part, the training of the one or more machine learning models. The one or more robotic task predictions may be provided 204 to the model-based control algorithm associated with the physical robotic system. The robotic task may be performed 206, via the model-based control algorithm associated with the robotic system, on the physical robotic system based upon, at least in part, the one or more robotic task predictions defined by the one or more machine learning models.

Figure 3:
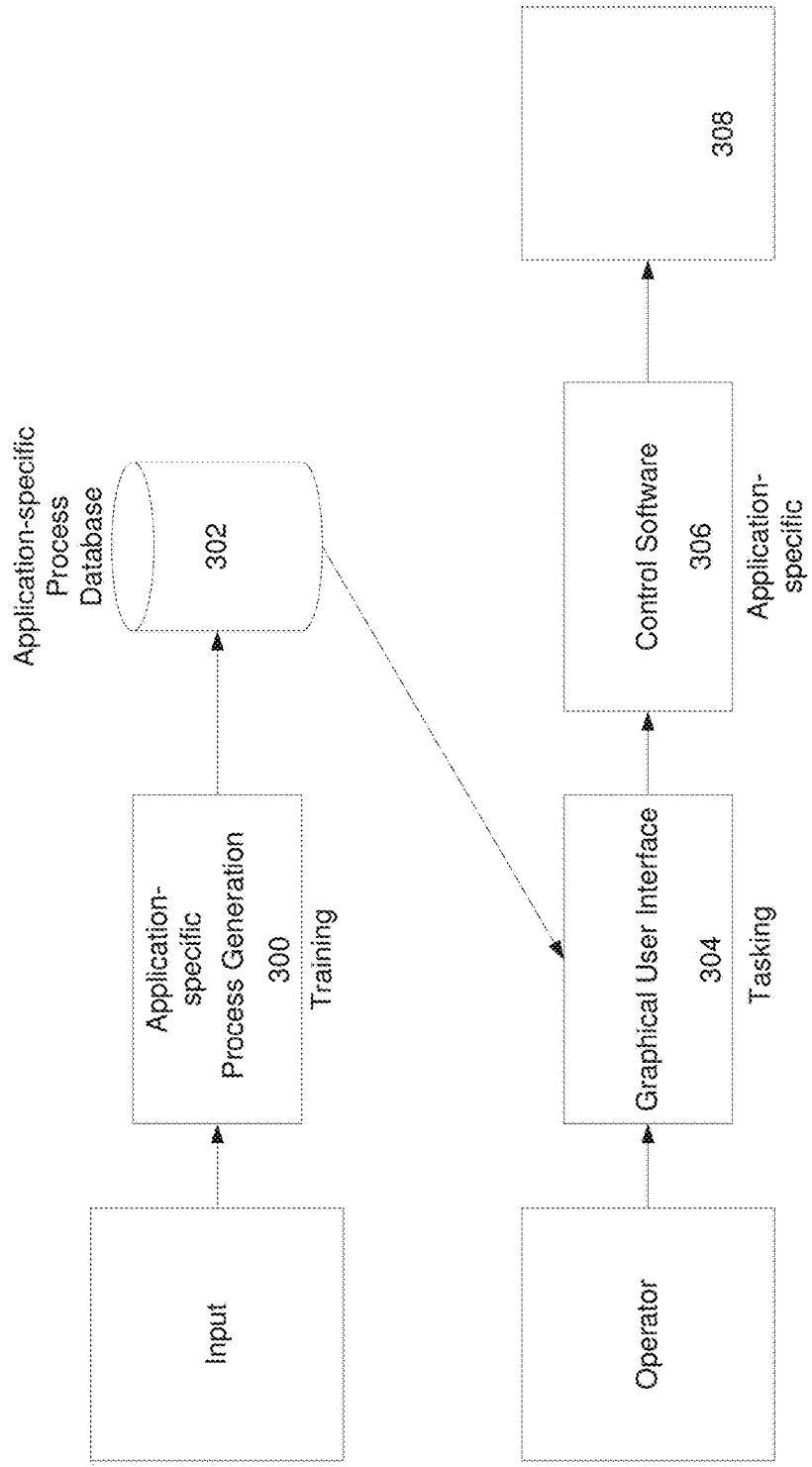
FIG. 3 is a block diagram of a natural tasking robotic system, according to an embodiment of the present disclosure.

Referring now to FIG. 3, an embodiment of a physical robotic system 64 is provided. Physical robotic system 64 may include a plurality of physical components, portions of which may be designed for a particular application and/or task. The first component of the physical robotic system may include a software system 300 for adding new processes to a database 302. Once built, database 302 may be reused by operators in the field or remotely. Operators may select an element from the database 302 using a graphical user interface 304 for execution by the control software 306 as is shown in FIG. 3. Procedures for the particular application and/or robotic task (e.g. pick-and-place, robotic assembly, etc.) may be added to database 302 by experts offline. This database 302 may be used with a graphical user interface 304 and tasking software online to develop each procedure for each task. The software modules may include, but are not limited to, training, tasking, and performance of the particular task, etc. All of this may be used to control the manner of operation of robotic hardware 308. Robotic hardware 308 may respond to the controls received from control software 306, however, it should be noted that the robotic hardware itself may be limited by its own maximum number of degrees of freedom as is discussed in further detail hereinbelow.

In a physical robotic system, the phrase "degrees of freedom" may refer to specific, defined modes in which a mechanical device or system can move. The number of degrees of freedom may be equal to the total number of independent displacements or aspects of motion. For example, a six degrees of freedom ("6DOF") scenario may refer to the freedom of movement of a rigid body in three-dimensional space. Specifically, the body may be free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). In contrast, placing a point in space may correspond three degrees of freedom, specifying a distance between two points on different links is one degree of freedom, etc.

In some embodiments, the phrase "robotic system", as used herein, may include a system of one, two, and/or any number of robots. In this way, an entire robotic system DOF may refer to the sum of the DOFs on each of the individual robots. This may include one DOF for each single-axis joint, and six DOF for a free-moving base. For example, for a robotic system that includes two robots, one having 6DOF and the other having 5DOF, the available entire robotic system degrees of freedom may be 11DOF.

Embodiments of the present disclosure may generally begin with the execution of an existing process (e.g., an existing model-based control algorithm). A model-based control algorithm may generally include a 3D model-based representation of the environment (e.g., including a part or object to manipulate) to convert sensor input to physical robot system commands. This model-based control algorithm or process may be implemented by some other generally algorithmic (i.e., non-machine learning model-based) method. However, it will be appreciated that in some embodiments the model-based control algorithm may involve machine learning models (e.g., neural networks, artificial engines, etc.). This model-based control algorithm may work well enough most of the time, for example, achieving a e.g., 95% success rate. The model-based control algorithm may include a way of measuring the outcome of the process, to detect when the desired result is not achieved, or to trigger a recovery or error mechanism. There may be many reasons for an error, including variations in the inputs, errors in the existing algorithm, etc. The human who designed the process may not be aware of those factors and/or may not be able to devise a method to overcome the errors they generate.

In some embodiments of the present disclosure and as will be discussed in greater detail below, a machine learning model may be configured to observe or monitor a model-based control algorithm. The machine learning model may receive all the same inputs as the model-based control algorithm, including the measured outcome. In some embodiments, this may be analog data (i.e. not pass/fail or good/bad). The machine learning model may also receive in-process data, i.e. measurements of the existing process as it is executed. This may include joint angles of a robot, the speed of a robot, the force exerted on an object, etc. Accordingly, the machine learning model(s) may make predictions on the state of the physical robotic system (e.g. pose and pickability/validity of parts). The machine learning model may "learn" in a supervised manner from examples of an existing process or model-based control algorithm associated with a physical robotic system.

In some embodiments and as will be discussed in greater detail below, as the existing process (e.g., model-based control algorithm) is executed, the machine learning model may be trained by observing. As part of the training, the machine learning model produces its own proposed process control outputs. These outputs may be fed into a simulation, which then predicts the outcome of a process using the machine learning model's proposed process control outputs. This outcome may be compared to the actual outcome of the existing process. As the machine learning model is trained, it may more closely mimic the existing process. This may be an advantage of its own, as machine learning models may execute faster and at lower cost than existing model-based control algorithms/controllers. The machine learning model may also produce a better control solution than the existing model-based control algorithms/controllers. When the machine learning model, on average, exceeds the performance of the existing process controller (e.g., model-based control algorithm), the machine learning model can assume command of the process. The machine learning model may then continue to learn from its own mistakes, resulting in better performance. Thus, performance beyond the ingenuity of the control system designer can be achieved, without the startup problems, and while starting from the highest level achievable by a human designer.

In some embodiments, a machine learning model that has been trained in this manner can be duplicated and used in identical processes elsewhere. In some embodiments, if those other uses have subtle differences, the machine learning model can be configured to continue to adapt to the individual variations.

Accordingly, embodiments of the present disclosure may allow for continuously improving the performance of an existing model-based control algorithm using deep learning. For example, an artificial intelligence (A.I.) apprentice (e.g., one or more machine learning models) may be introduced to learn by observing a master (e.g., a model-based control algorithm) perform a robotic task (e.g., pick-and-place of parts or objects). Instead of aiming at replacing the master with the apprentice, the apprentice and the master may be used jointly, based upon the following principles: 1) the apprentice learns by observing the master; 2) the apprentice makes predictions and provides inputs to the master which can decide to use them or not; and 3) the master makes the final decision, e.g. verifying by simulation that a planned manipulator trajectory is indeed obstacle-free before making a physical move.

In this manner, the apprentice can learn a direct mapping between input data and any master system output or intermediate state whose estimation often requires multiple, expensive steps. When used online the apprentice may make fast predictions on the system state, much faster than the master itself. In some embodiments, these predictions can be used by master as first guess.

Figure 2:
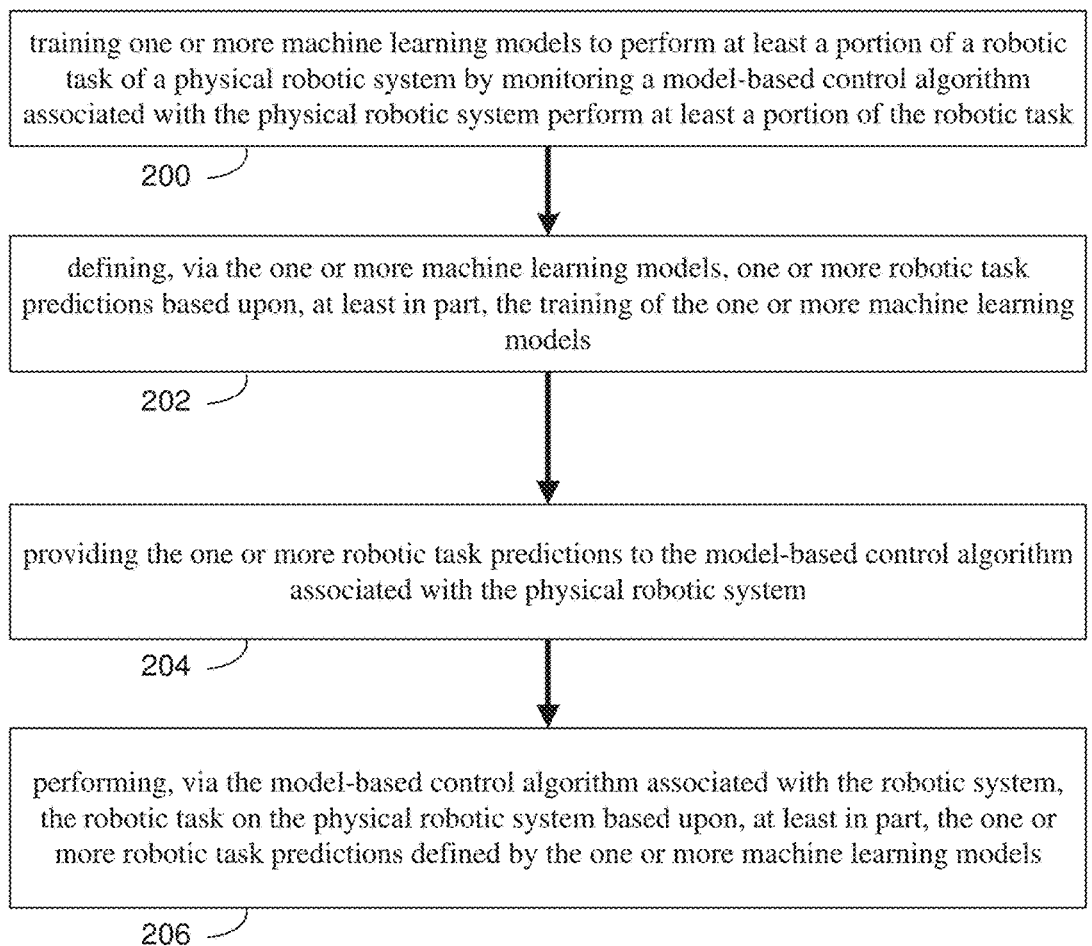
FIG. 2 is a flow chart of one implementation of the robotic task prediction process of FIG. 1.

Referring again to the example of FIG. 2 and in some embodiments, robotic task prediction process 10 may train 200 one or more machine learning models to perform at least a portion of a robotic task of a physical robotic system by monitoring a model-based control algorithm associated with the physical robotic system perform at least a portion of the robotic task. For example, robotic task prediction process 10 may train apprentice machine learning models to provide predictions for a portion of a robotic task by monitoring or observing the model-based control algorithm associated with a physical robotic system perform the portion of the robotic task.

In some embodiments, a physical robotic system may be controlled by a model-based control algorithm to perform a robotic task (e.g., a pick-and-place process, manipulating an object, a bin-picking process, etc.). To illustrate, consider, for example purposes only, a bin-picking robotic task where finding a valid part in a bin may involve multiple steps (ROI estimation, part matching, part validation), where each step may be repeated multiple times. As will be discussed in greater detail below, an apprentice machine learning model may learn a direct mapping between an input scan and part matching and validation (e.g. estimating which scanned points belong to valid parts) from a master model-based control algorithm. When used online, the part matching and validation predictions from the apprentice can be validated first by the master model-based control algorithm. If confirmed invalid, the master can fall back to the standard master pipeline (as shown in FIG. 4).

Figure 4:
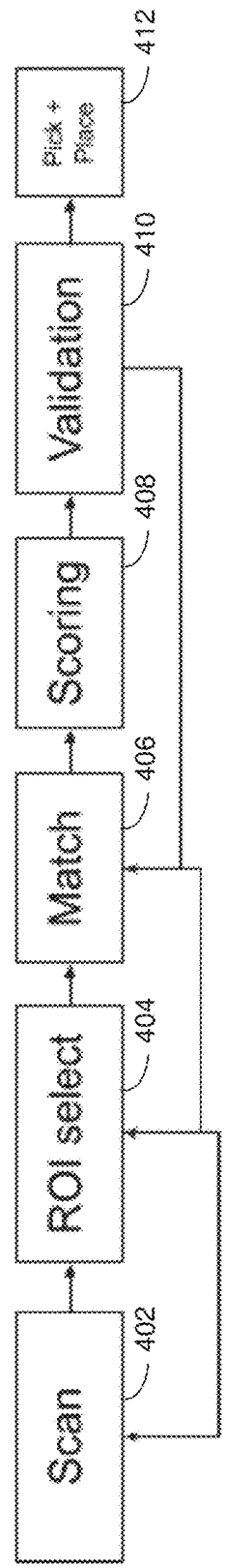
FIG. 4 is a block diagram of a bin-picking process, according an embodiment of the present disclosure.

Referring also to FIG. 4 and in some embodiments, an example bin-picking process/pick-and-place process of a model-based control algorithm may include the steps or sub-processes of receiving 402 a new scan via one or more sensors. A region of interest (ROI) may be selected 404 and if all ROIs are exhausted, a new scan may be received 402. A match 406 may be found (e.g., including N parts in ROI). If no parts are detected, a new ROI may be selected 402. The N parts may be scored 408 (e.g., based on match quality) using a model fitting criteria. Validation 410 may include running simulations to find which of the N parts can be picked. In some embodiments, if none of the N parts can be validated, new parts may be matched 406 in the ROI. A part or object may be picked and placed 412.

In some embodiments, the typical bin-picking/pick-and-place process of FIG. 4 can be seen as a succession of processes or sub-processes performing the following actions: (i) generating hypotheses; (ii) ranking the hypotheses; and (iii) scoring/validating them. These processes generally include ROI selection (e.g., priority zone), matching (e.g., part detection in a ROI); and pick validation and/or path planning. Actions (i) and (ii) are often the most time consuming tasks. Accordingly and in some embodiments of the present disclosure, these actions can be performed or learned by one or more machine learning models. In some embodiments, action (iii) is usually performed quickly and may provide safety guarantees. For example, for the "match" step, action (iii) involves computing a matching score, which guarantees that parts are correctly detected. For path planning, action (iii) confirms that a path is safe, cleared of all obstacles. In some embodiments, it may not be possible to ensure that an artificial intelligence system (e.g., a machine learning model) can learn enough to perform action (iii) with sufficient accuracy. Accordingly, artificial intelligence integration may train the machine learning model to make fast and accurate predictions for actions (i) and (ii), and let master run action (iii). Integrating artificial intelligence in this way may be simple, non-intrusive, and can be modular (e.g. artificial intelligence could be used to predict a part of the full system).

A cycle time associated with a pick-and-place process may depend on how successful ROI select 404 and Match 406 are at estimating ROIs or parts that are actually pickable. In some embodiments, if the selected ROI 404 has no valid part, all parts detected by Match 406 may be useless (validated without success). Match 406 and Validation 410 may be called multiple times, causing long cycle times. Alternatively, if the ROI focuses on a valid part, Match 406 may find a part or object which can be validated right away, making a cycle time short.

In some embodiments, the better the selected ROIs 404 and matches 406, the shorter the cycle time will be. In the bare master model-based control algorithm (e.g., a bin-picking system/process), however, ROI select 404 and Match 406 may be pick-agnostic and, as such, there is no guarantee that their estimations are more likely to be pickable. While an example of a particular robotic task (e.g., a bin-picking process) has been introduced above and will be discussed in greater detail below, it will be understood that there are many robotic tasks of various model-based control algorithms that may be observed to train one or more machine learning models within the scope of the present disclosure.

Figure 5:
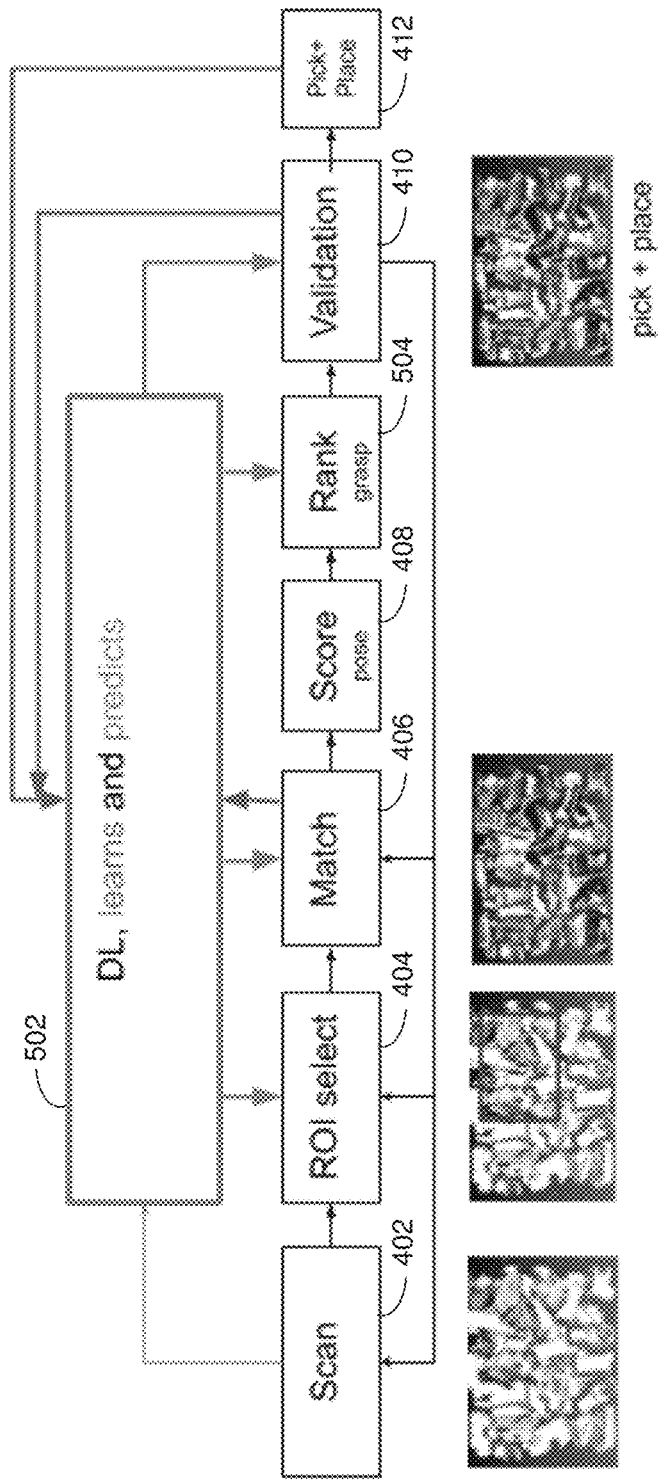
FIG. 5 is a block diagram of an machine learning model in conjunction with a model-based control algorithm associated with a physical robotic system, according to an embodiment of the present disclosure.

In some embodiments, robotic task prediction process 10 may identify, via the model-based control algorithm, one or more objects within the selected region of interest, thus defining one or more identified objects. For example and as discussed above in a bin-picking example of a robotic task, a model-based control algorithm may independently (e.g., independently from an apprentice machine learning model) identify a region of interest (ROI) and match any objects identified within the selected ROI with one or more reference objects in a database of objects. For example and in some embodiments, model-based control algorithm may receive a scan of at least a portion of a bin with at least one object positioned in the bin. Referring also to FIG. 5 and in some embodiments, receiving a scan of at least a portion of a bin may include receiving a plurality of scanned images from one or more sensors. In some embodiments, the plurality of images may include two-dimensional images, three-dimensional images, grayscale images, etc. In some embodiments, the scan may include at least a portion of a video. For example, sensors of a physical robotic system (e.g., robotic system 64) may provide both three-dimensional and grayscale images. In this manner, one or more robots may scan the at least a portion of the bin. In some embodiments, model-based control algorithm 20 (e.g., the master) may generally use noisy three-dimensional images. In some embodiments, apprentice machine learning model(s) 74 (e.g., the apprentice) may learn from grayscale images (and/or three-dimensional images) which are overall less noisy. However, it will be appreciated that other types of scanned images may be received and/or other types of scanned images may be used by each of the model-based control algorithm and the apprentice machine learning model(s).

In some embodiments, robotic task prediction process 10 may score, via the model-based control algorithm, the one or more identified objects using a model fitting criteria, thus defining one or more ranked objects. For example, robotic task prediction process 10 may, via the model-based control algorithm, score the one or more identified objects to define a match quality. In some embodiments, the model-based control algorithm's scoring of identified objects in the selected ROI may be independent from the apprentice machine learning model's identification of locations of the one or more pickable regions in the at least a portion of the bin. In some embodiments, robotic task prediction process 10 may rank 504 the one or more identified objects to define one or more ranked objects based upon, at least in part, the scoring of the objects of the at least a portion of the bin. In some embodiments, robotic task prediction process 10 (e.g., via the model-based control algorithm) may perform one or more simulations to determine which of the one or more ranked objects can be picked by a physical robotic system, thus defining one or more pickable objects. For example, model-based control algorithm may validate one or more ranked objects that can be picked by a physical robotic system. Similarly, model-based control algorithm may invalidate one or more ranked objects that cannot be picked up by the physical robotic system. In this manner, the master model-based control algorithm may select an ROI, match the parts located in the selected ROI, and determine which objects may be picked by the physical robotic system independently from and in parallel with the apprentice machine learning model.

In some embodiments, robotic task prediction process 10 may receive a pick validation from the model-based control algorithm indicating whether an identified object is valid based upon, at least in part, the one or more simulations or invalid based upon, at least in part, the scoring of the one or more identified objects. For example, each time a model-based control algorithm identifies a detected part as valid or invalid (e.g. part rejected by the ranker, or validated by validation), a new training pair <x, y> may be generated. In this manner, generating a training pair may include generating a scanned image of the at least a portion of the bin and a corresponding heatmap indicating a location of the identified object. For example, the training pair <x,y> may be generated where "x" is the image and "y" is the corresponding heatmap. In some embodiments, the image "x" can be a 1-channel depth image, a 3-channel XYZ reconstruction, and/or a 1-channel grayscale texture image. In some embodiments, the heatmap "y" m a 1-channel intensity image, which size may be the same as the image "x". In some embodiment, its value may be zero everywhere except at the location of the part or object. In some embodiments, the first machine learning model may be updated based upon, at least in part, the training pair. For example, the training pair may be used to update or modify the weights of the first apprentice machine learning model. In some embodiments, when enough <x,y> pairs have been collected (e.g., a predetermined threshold), the apprentice machine learning model may be trained or retrained. To improve robustness, data augmentation methods can be performed to augment the dataset, i.e. generating synthetic data by adding noise, applying geometric and optical transformations to the original training data. It will be appreciated that various methods can be used to update the first apprentice machine learning model.

In some embodiments, robotic task prediction process 10 may define 202, via the one or more machine learning models, one or more robotic task predictions based upon, at least in part, the training of the one or more machine learning models. As will be discussed in greater detail below, robotic task predictions may generally include predictions about various aspects of the robotic task. Returning to the previous bin-picking example and for example purposes only, robotic task predictions may include pickable areas or ROIs, object locations or matchings to known objects, three-dimensional pose or grasp information associated with an object, etc. In this manner, the at least a portion of the robotic task may include one or more sub-processes that are often the most time consuming, that may be performed by A.I. systems (e.g., one or more machine learning models) instead of a real/physical system (e.g., a model-based control algorithm). In some embodiments, the sub-processes not using A.I. systems (e.g., one or more machine learning models) may usually be fast and, using a real/physical system (e.g., a model-based control algorithm), can further provide safety guarantees. Accordingly, the cycle time for robotic task prediction process 10 may be reduced while providing still safety constraints.

Figure 6:
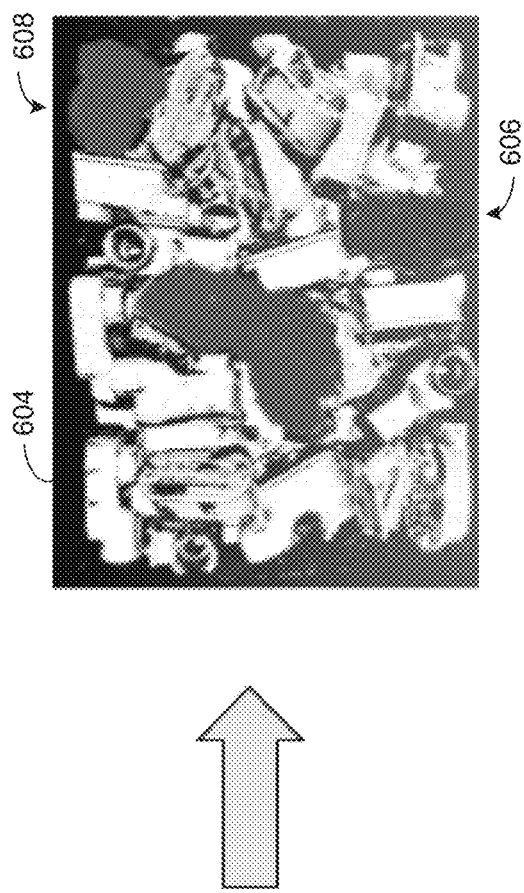
FIG. 6 is diagrammatic view of a bin (left) and a plurality of pickable regions (right) identified in the bin by a machine learning model, according to an embodiment of the present disclosure.
Figure 7:
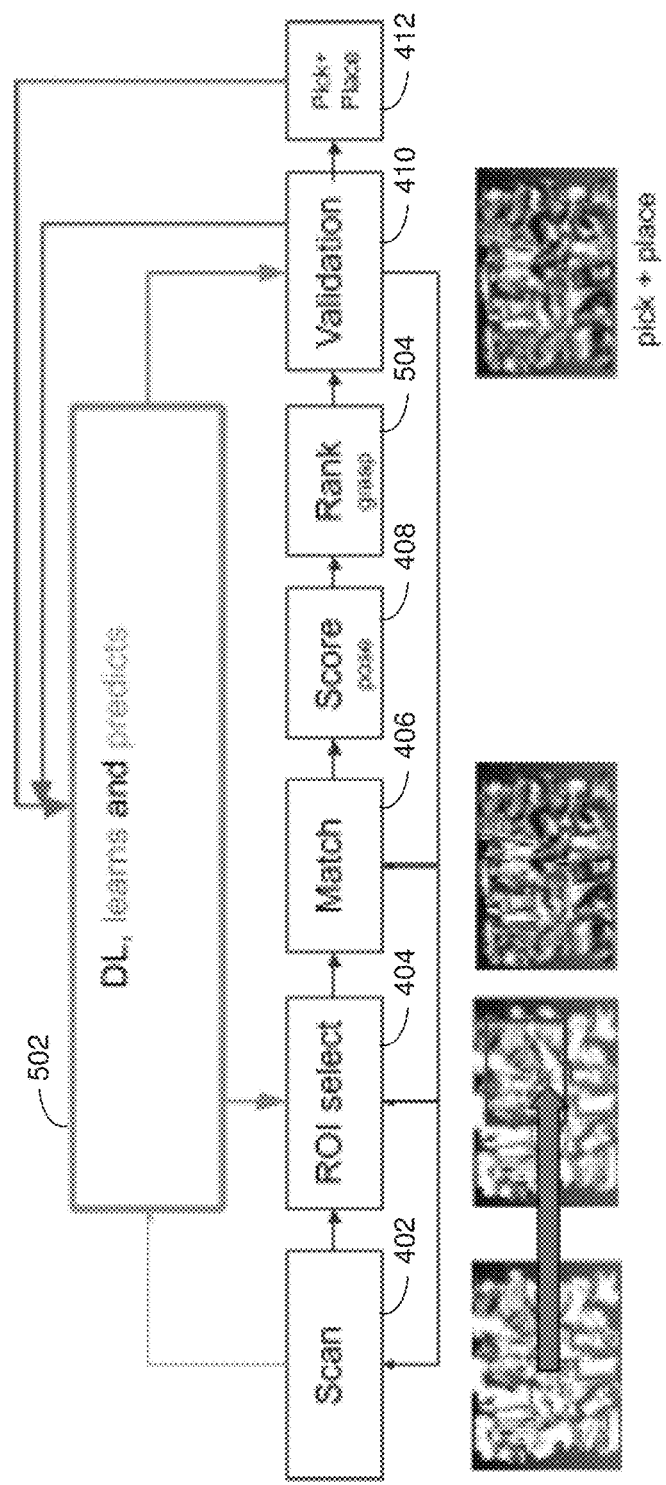
FIG. 7-9 are block diagrams of machine learning models in conjunction with a model-based control algorithm associated with a physical robotic system, according to one or more embodiments of the present disclosure.
Figure 8:
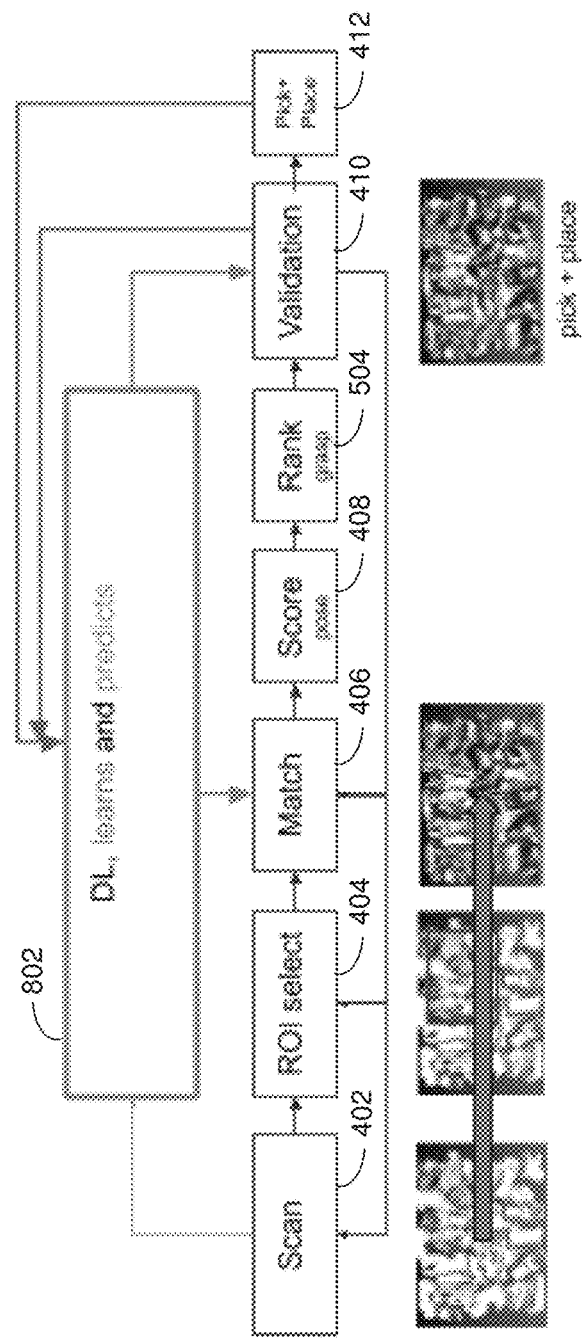
Figure 9:
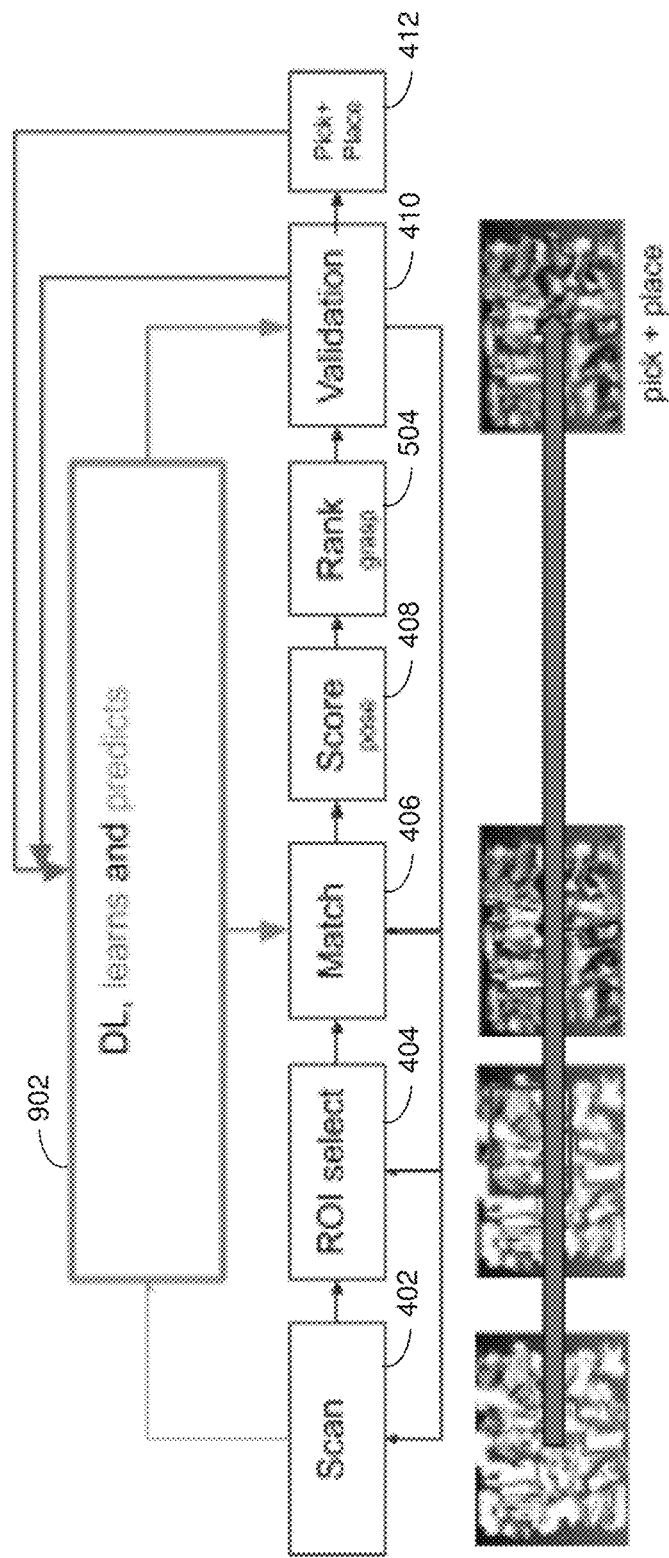
Figure 10:
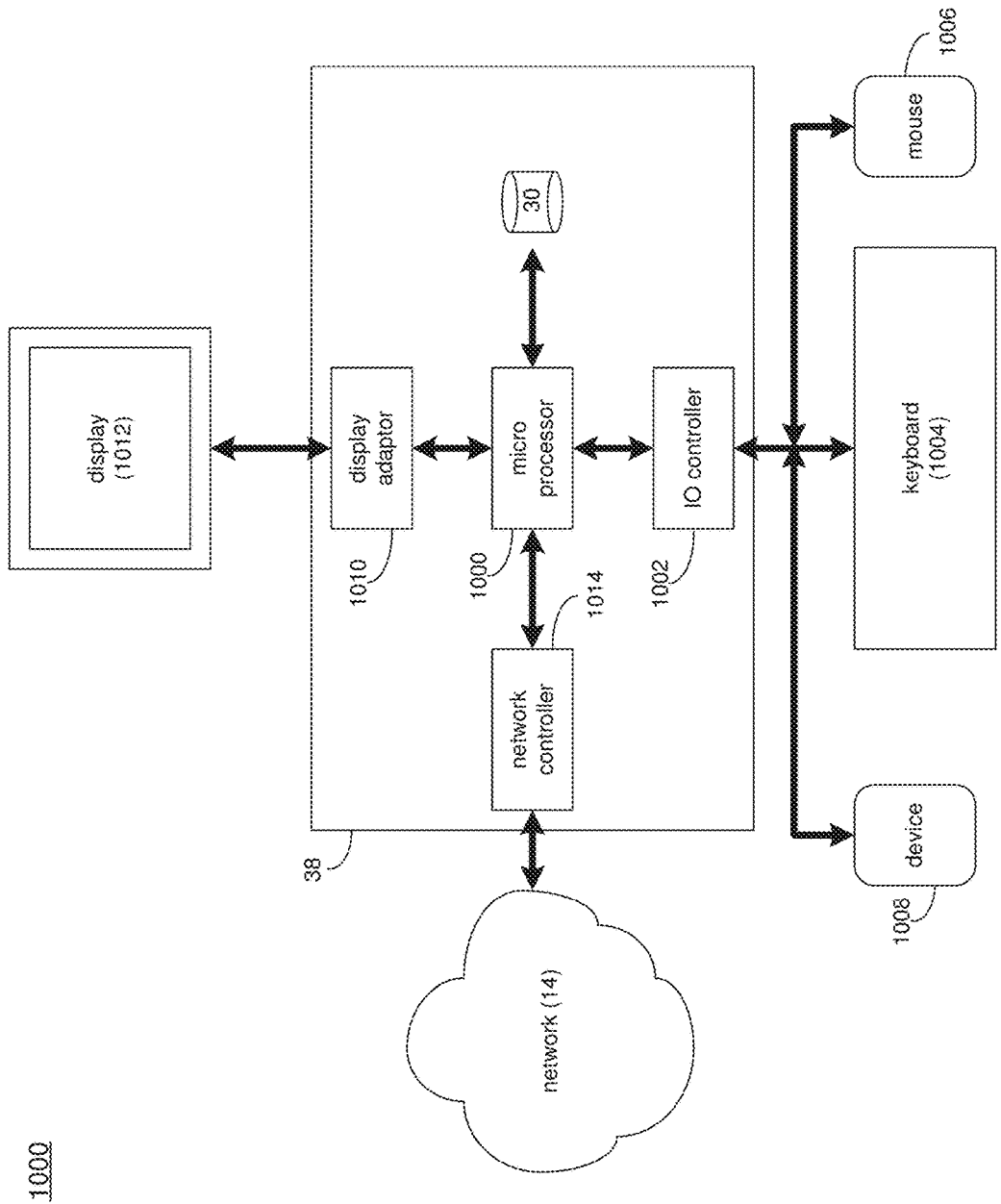
FIG. 10 is an example diagrammatic view of a client electronic device of FIG. 1 according to one or more example implementations of the disclosure.

In some embodiments, defining 202, via the one or more machine learning models, the one or more robotic task predictions may include identifying, via a first neural network, a location of one or more pickable regions in the at least a portion of the bin based upon, at least in part, the scan of the least a portion of the bin. For example and as shown in at least FIG. 5, a first apprentice machine learning model (e.g., first apprentice machine learning model 502) may be trained and used as a valid region predictor. In some embodiments, the first apprentice machine learning model may learn to predict the most pickable regions (i.e., returning positive validation) in images by observing a master model-based control algorithm detect and validate parts. Referring also to FIG. 6 and in some embodiments, predictions may be modeled using a Convolutional Neural Network (CNN). However, it will be appreciated that any type of neural network, artificial intelligence mode, machine learning model, etc. may be used within the scope of the present disclosure. For example, apprentice machine learning model 502 may receive scanned image input 602 (e.g., a three-dimensional image and/or an RGB image) and may output or generate a heatmap indicating the most likely pick areas in the original input image. Example locations may be seen in the heatmap (e.g., heatmap 604) with one or more pickable regions (e.g., pickable regions 606, 608). In some embodiments, a first apprentice machine learning model type may be similar to semantic segmentation for instance, which may map sensor image to label image (e.g., label=pickable/non-pickable).

In some embodiments, robotic task prediction process 10 may provide 204 the one or more robotic task predictions to a model-based control algorithm. Returning again to the bin-picking example and for example purposes only, providing 204 the one or more object predictions to the model-based control algorithm may include providing the location of the one or more pickable regions in the at least a portion of the bin to a model-based control algorithm. For example, the location of the one or more pickable regions identified by the first apprentice machine learning model (e.g., first apprentice machine learning model 502) may be provided by the first apprentice machine learning model to the model-based control algorithm (e.g., model-based control algorithm 20). The location of the one or more pickable regions may be used by the master model-based control algorithm to select an ROI within the bin.

In some embodiments, robotic task prediction process 10 may perform 206, via the model-based control algorithm associated with the robotic system, the robotic task on the physical robotic system based upon, at least in part, the one or more robotic task predictions defined by the one or more machine learning models. Returning again to the previous bin-picking example and in some embodiments, performing 206, via the model-based control algorithm associated with the robotic system, the robotic task on the physical robotic system based upon, at least in part, the one or more robotic task predictions defined by the one or more machine learning models may include selecting, via the model-based control algorithm, a region of interest based upon, at least in part, the location of the one or more pickable regions in the at least a portion of the bin. As discussed above, conventional model-based control algorithms may be "pick-agnostic" and, as such, there is no guarantee that the model-based control algorithm's estimations are more likely to be pickable. In some embodiments, one way to overcome this limitation may be to use deep learning from the first apprentice machine learning model to predict valid image regions directly, and use them to "inform" ROI select 404 and Match 406. In this manner, learning for the first apprentice machine learning model may happen on-the-fly by observing the model-based control algorithm operate.

In some embodiments, the location of the one or more pickable regions may be provided to the model-based control algorithm after the first machine learning model is updated with a predetermined number of training pairs. For example, when the first apprentice machine learning model is trained enough (this can be based using cross-validation testing), the first apprentice machine learning model can start making predictions that can be integrated by the master model-based control algorithm. In some embodiments, the predetermined number of training pairs may be user-defined or may be defined by robotic task prediction process 10.

In some embodiments, performing 206, via the model-based control algorithm associated with the robotic system, the robotic task on the physical robotic system based upon, at least in part, the one or more robotic task predictions defined by the one or more machine learning models may include selecting, via the model-based control algorithm, a region of interest based upon, at least in part, the location of the one or more pickable regions in the at least a portion of the bin as long as the first apprentice machine learning model provides correct predictions (i.e. ROIs with at least one valid part inside). When the first apprentice machine learning model provides an incorrect prediction, the master model-based control algorithm may fall back to the original ROI select algorithm as shown in FIG. 4. However, it will be appreciated that more complex policies can be implemented (e.g., using the theoretical performance of the first apprentice machine learning model) to control how often or when to use the predictions of the first apprentice machine learning model.

Continuing with the previous bin-picking example for the robotic task and in some embodiments, robotic task prediction process 10 may use one or more apprentice machine learning models to improve a model-based control algorithm when detecting and/or segmenting objects. For example and in some embodiments, defining 202, via the one or more machine learning models, the one or more robotic task predictions may include defining, via a second machine learning model, one or more object locations in the at least a portion of the bin based upon, at least in part, the scan of the least a portion of the bin. In some embodiments, robotic task prediction process 10 may train a second apprentice machine learning model to learn the two-dimensional (or three-dimensional) location of parts in images by observing the master model-based control algorithm detect parts (e.g., Match 406). In other words, once the part is segmented (from others), its pose can easily be computed by Match 406 via model-based control algorithm 20.

In some embodiments, the second apprentice machine learning model may be a convolutional Neural Network (CNN). However, it will be appreciated that any type of machine learning model may be used within the scope of the present disclosure. Referring also to the example of FIG. 8 and in some embodiments, second apprentice machine learning model 802 may receive an input image of the at least a portion of the bin. In some embodiments, the image may be a three-dimensional image and/or a RGB image. However, it will be appreciated that any image may be received and used as an input by second apprentice machine learning model within the scope of the present disclosure. In some embodiments, the second apprentice machine learning model may be similar to instance segmentation as in Mask R-CNN.

In some embodiments, the one or more object locations in the at least a portion of the bin may include a list of bounding boxes and a binary mask associated with the at least one object. For example, second apprentice machine learning model 802 may generate a list of bounding boxes and/or a binary mask for all detections of objects in the at least a portion of the bin. In some embodiments, the locations of the one or more pickable regions identified by the first apprentice machine learning model may be provided to the second apprentice machine learning model. From the locations of the one or more pickable regions, the second apprentice machine learning model may define one or more object locations in the at least a portion of the bin. In this manner, second apprentice machine learning model 802 may predict the bounds of one or more objects within the pickable region(s) of the at least a portion of a bin.

Returning again to the bin-picking example of a robotic task of the model-based control algorithm and in some embodiments, providing 204 the one or more robotic task predictions to the model-based control algorithm may include providing the one or more object locations in the at least a portion of the bin to the model-based control algorithm. For example, and as discussed above, the one or more object locations may be used by the model-based control algorithm to identify one or more objects within the selected region of interest of the at least a portion of the bin.

In some embodiments and referring again to the above bin-picking robotic task example, performing 206, via the model-based control algorithm associated with the robotic system, the robotic task on the physical robotic system based upon, at least in part, the one or more robotic task predictions defined by the one or more machine learning models may include identifying, via the model-based control algorithm, one or more objects within the selected region of interest based upon, at least in part, the one or more object locations, thus defining one or more machine learning model-identified objects. For example, model-based control algorithm 20 may receive the one or more object locations (e.g., list of bounding boxes and/or binary masks for each detected object) and may determine whether to use the one or more object locations to identify one or more objects within the selected region of interest. As discussed above, model-based control algorithm 20 may use the one or more object locations provided by the second apprentice machine learning model as long as the one or more object locations are accurate. In this manner, the master model-based control algorithm may determine whether or not to use the input from the second apprentice machine learning model.

As discussed above and in some embodiments, robotic task prediction process 10 may identify, via the model-based control algorithm, one or more objects within the selected region of interest, thus defining one or more identified objects. Referring again to the example of FIG. 8 and in some embodiments, model-based control algorithm 20 may identify one or more objects within the selected region of interest (e.g., Match 406 and Score 408). In some embodiments, the second machine learning model may be updated based upon, at least in part, the one or more identified objects. In this manner, the second apprentice machine learning model (e.g., second apprentice machine learning model 902) may observe the identifications of objects made by the master model-based control algorithm to improve the second apprentice machine learning model's accuracy. In some embodiments, robotic task prediction process 10 may train another apprentice machine learning model (e.g., a CNN) to classify the three-dimensional pose of objects from images (e.g., cropped with bounding boxes).

In some embodiments, robotic task prediction process 10 may train and use an apprentice machine learning model or combination of machine learning models to predict a robotic task (e.g., a part or object pose and to determine pick information). Referring also to the example of FIG. 9 and in some embodiments, defining 202, via the one or more machine learning models, the one or more robotic task predictions may include generating, via a third machine learning model (e.g., third apprentice machine learning model 902), a three-dimensional pose associated with the at least one object based upon, at least in part, the scan of the at least a portion of the bin and the one or more object locations in the at least a portion of the bin. In some embodiments, robotic task prediction process 10 may generate, via the third machine learning model, a validation score for each three-dimensional pose associated with the at least one object. For example, third apprentice machine learning model 902 may include first apprentice machine learning model 502 and/or second apprentice machine learning model 802. In this manner, the combination of the first, second, and/or third apprentice machine learning models may be used to generate a three-dimensional pose associated with at least one object. For example, the combination of the first, second, and/or third machine learning models may learn all necessary information for direct validation. In some embodiments, the apprentice machine learning model(s) may predict the location (e.g., a two-dimensional bounding box) of parts along with its three-dimensional pose and pick information (e.g., a validation score for each grasp). In this manner, the apprentice machine learning model(s) may more quickly determine a grasp for a physical robotic system to pick a desired object from the bin than the master model-based control algorithm can independently.

In some embodiments, the third apprentice machine learning model may receive an input in the form of one or more scanned images (e.g., three-dimensional images/video and/or RGB images). The third apprentice machine learning model may generate a list of two dimensional bounding boxes and/or a binary mask for each identified object; a three-dimensional part pose; and/or a validation score for each grasp. In some embodiments, the second apprentice machine learning model may generate the list of two-dimensional bounding boxes and/or binary mask for each identified part or object. In some embodiments, the third apprentice machine learning model may be the combination of instance segmentation to extract part location and bounding box (e.g., as discussed above for the second apprentice machine learning model) and a classification machine learning model to predict three-dimensional pose and pick information from the bounding boxes. In some embodiments, the third apprentice machine learning model may include a convolutional machine learning model such as PoseCNN and/or Pose Regression CNN. It will be appreciated that any type of machine learning model may be used within the scope of the present disclosure.

In some embodiments, when given a new input scan of at least a portion of a bin, an apprentice machine learning model (e.g., second apprentice machine learning model and/or third apprentice machine learning model) may generate predictions to get a list of bounding boxes for one or more identified objects or parts. In some embodiments, the third apprentice machine learning model may generate three-dimensional poses and pick information (e.g., validation score for each grasp).

Continuing with the above bin-picking example and in some embodiments, providing 204 the one or more object predictions to the model-based control algorithm may include providing the three-dimensional pose associated with the at least one object and the validation score for each three-dimensional pose associated with the at least one object to the model-based control algorithm. The model-based control algorithm may select the part and/or grasp with the highest predicted validation score.

In some embodiments, performing 206, via the model-based control algorithm associated with the robotic system, the robotic task on the physical robotic system based upon, at least in part, the one or more robotic task predictions defined by the one or more machine learning models may include scoring, via the model-based control algorithm, the three dimensional pose associated with each object of the at least one object. In this manner, the model-based control algorithm may verify if the three-dimensional pose is correct. Robotic task prediction process 10 may perform one or more simulations to determine which three dimensional pose associated with the at least one object can be picked by a physical robotic system (e.g., a robotic arm). In some embodiments, model-based control algorithm 20 may validate the predicted validation score for each three-dimensional pose generated by the third apprentice machine learning model.

In some embodiments, robotic task prediction process 10 may receive, at the third machine learning model, a pick validation from the model-based control algorithm based upon, at least in part, the one or more simulations. For example, model-based control algorithm 20 may validate each three-dimensional pose with one or more simulations that determine whether a physical robotic system could pick up the object with the given three-dimensional pose. In some embodiments, the simulation may indicate that an object with a given three-dimensional pose cannot be picked by a physical robotic system. In this example, model-based control algorithm may generate a negative pick validation indicating that the three-dimensional pose associated with the object cannot be picked by a physical robotic system. In another example, a simulation may indicate that an object with a given three-dimensional pose can be picked by a physical robotic system. In this example, model-based control algorithm may generate a positive pick validation. In some embodiments, robotic task prediction process 10 may update the third apprentice machine learning model based upon, at least in part, the pick validation. For example, new training data may be added to the training set after each positive or negative validation. Accordingly, the third apprentice machine learning model may learn from its predictions and the validations by the master model-based control algorithm.

In some embodiments, robotic task prediction process 10 may pick, via a physical robotic system, an object from the at least a portion of the bin based upon, at least in part, the location of the one or more pickable regions in the at least a portion of the bin. For example, based on the output of the first apprentice machine learning model, a physical robotic system (e.g., robotic system 64) may pick an object from a pickable region in the bin. In some embodiments, robotic task prediction process 10 may pick, via a physical robotic system, an object from the at least a portion of the bin based upon, at least in part, the one or more object locations. For example, based on the one or more object locations identified by the second apprentice machine learning model, a physical robotic system (e.g., robotic system 64) may pick an object from the object location. In some embodiments, robotic task prediction process 10 may pick, via a physical robotic system, an object from the at least a portion of the bin based upon, at least in part, the three-dimensional pose associated with the at least one object. For example, based on the three-dimensional pose associated with at least one object, a physical robotic system (e.g., robotic system 64) may pick the object from the bin.

While an example of a bin-picking process has been provided to illustrate the training of one or more machine learning models and defining of robotic task predictions, it will be appreciated that one or more machine learning models may be trained to predict portions of any robotic task within the scope of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may, but not always, represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

A number of implementations of the invention have been described. Nevertheless, it will be understood that various modifications may be made without departing from the spirit and scope of the invention.

For example, in some implementations, the robot may be any mechanical system configured to pick up at least one object and move it from one place to another.

Moreover, while in some implementations "a processor" may be used, it should be noted that this may include, but is not limited to, a processor associated with or separate from a robot controller, for example, a single processor separate from or included within the controller, a plurality of processors separate from or included within the controller, etc. In some cases, one processor located in one device may perform certain operations and another processor located in a physically separate area may perform other operations. Additionally and/or alternatively, some or all of the operations may be performed by a processor or group of processors located in a single device, such as those associated with the robotic systems included herein.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computing system including a processor and memory configured to perform operations comprising:
    training one or more apprentice machine learning models to perform at least a portion of a robotic task of a physical robotic system by monitoring a model-based control algorithm associated with the physical robotic system perform at least a portion of the robotic task;
    defining, via the one or more apprentice machine learning models, one or more robotic task predictions based upon, at least in part, the training of the one or more apprentice machine learning models;
    wherein the task predictions comprise at least one of:
        identification of a 3D pose or location of an object;
        identification of an object;
        location of one or more pickable regions within a bin; or
        selection of a region of interest within a bin;
    providing the one or more robotic task predictions to the model-based control algorithm associated with the physical robotic system; and performing, via the model-based control algorithm associated with the robotic system, the robotic task on the physical robotic system based upon, at least in part, the one or more robotic task predictions defined by the one or more apprentice machine learning models.

2. The computing system of claim 1, wherein the robotic task includes picking at least one object from a bin.

3. The computing system of claim 2, wherein defining, via the one or more machine learning models, the one or more robotic task predictions includes:
identifying, via a first apprentice machine learning model, a location of one or more pickable regions in at least a portion of a bin.

4. The computing system of claim 3, wherein providing the one or more robotic task predictions to the model-based control algorithm includes:
providing the location of the one or more pickable regions in at least a portion of the bin to the model-based control algorithm.

5. The computing system of claim 4, wherein performing, via the model-based control algorithm associated with the robotic system, the robotic task on the physical robotic system based upon, at least in part, the one or more robotic task predictions defined by the one or more apprentice machine learning models includes:
selecting, via the model-based control algorithm, a region of interest based upon, at least in part, the location of the one or more pickable regions in at least a portion of the bin.

6. The computing system of claim 5, wherein training the one or more apprentice machine learning models to perform the at least a portion of the robotic task of the physical robotic system by monitoring the model-based control algorithm associated with the physical robotic system perform the at least a portion of the robotic task includes:
identifying, via the model-based control algorithm, one or more objects within the selected region of interest, thus defining one or more identified objects;
scoring, via the model-based control algorithm, the one or more identified objects using a model fitting criteria, thus defining one or more ranked objects;
performing one or more simulations to determine which of the one or more ranked objects can be picked by the physical robotic system, thus defining one or more pickable objects.

7. The computing system of claim 6, further comprising:
receiving a pick validation from the model-based control algorithm indicating whether an identified object is valid based upon, at least in part, the one or more simulations or invalid based upon, at least in part, the scoring of the one or more identified objects;
generating a training pair including a scanned image of at least a portion of the bin and a corresponding heatmap indicating a location of the identified object; and
updating the first apprentice machine learning model based upon, at least in part, the training pair.

8. The computing system of claim 7, wherein the location of the one or more pickable regions is provided to the model-based control algorithm after the first apprentice machine learning model is updated with a predetermined number of training pairs.

9. The computing system of claim 2, wherein defining, via the one or more apprentice machine learning models, the one or more robotic task predictions includes:
defining, via a second apprentice machine learning model, one or more object locations in at least a portion of the bin based upon, at least in part, a scan of at least a portion of the bin.

10. The computing system of claim 9, wherein providing the one or more robotic task predictions to the model-based control algorithm includes:
providing the one or more object locations in at least a portion of the bin to the model-based control algorithm.

11. The computing system of claim 10, wherein performing, via the model-based control algorithm associated with the robotic system, the robotic task on the physical robotic system based upon, at least in part, the one or more robotic task predictions defined by the one or more apprentice machine learning models includes:
identifying, via the model-based control algorithm, one or more objects within a selected region of interest based upon, at least in part, the one or more object locations, thus defining one or more apprentice machine learning model-identified objects.

12. The computing system of claim 9, wherein the one or more object locations in at least a portion of the bin includes a list of bounding boxes and a binary mask associated with the at least one object.

13. The computing system of claim 8, further comprising:
identifying, via the model-based control algorithm, one or more objects within the selected region of interest, thus defining one or more identified objects.

14. The computing system of claim 13, further comprising:
updating the second apprentice machine learning model based upon, at least in part, the one or more identified objects.

15. The computing system of claim 14, wherein defining, via the one or more apprentice machine learning models, the one or more robotic task predictions includes:
generating, via a third apprentice machine learning model, a three-dimensional pose associated with the at least one object based upon, at least in part, a scan of the at least a portion of the bin and the one or more object locations in at least a portion of the bin.

16. The computing system of claim 15, further comprising:
generating, via the third apprentice machine learning model, a validation score for each three-dimensional pose associated with the at least one object.

17. The computing system of claim 16, wherein providing the one or more object predictions to the model-based control algorithm includes:
providing the three-dimensional pose associated with the at least one object and the validation score for each three-dimensional pose associated with the at least one object to the model-based control algorithm.

18. The computing system of claim 17, wherein performing, via the model-based control algorithm associated with the robotic system, the robotic task on the physical robotic system based upon, at least in part, the one or more robotic task predictions defined by the one or more apprentice machine learning models includes:
scoring, via the model-based control algorithm, the three dimensional pose associated with each object of the at least one object; and
performing one or more simulations to determine which three dimensional pose associated with the at least one object can be picked by the physical robotic system.

19. The computing system of claim 18, further comprising:
   receiving a pick validation from the model-based control algorithm based upon, at least in part, the one or more simulations; and
   updating the third apprentice machine learning model based upon, at least in part, the pick validation.

20. The computing system of claim 5, further comprising:
   picking, via the physical robotic system, an object from at least a portion of the bin based upon, at least in part, the location of the one or more pickable regions in at least a portion of the bin.

21. The computing system of claim 11, further comprising:
   picking, via the physical robotic system, an object from at least a portion of the bin based upon, at least in part, the one or more object locations.

22. The computing system of claim 15, further comprising:
   picking, via the physical robotic system, an object from at least a portion of the bin based upon, at least in part, the three-dimensional pose associated with the at least one object.

23. The computing system of claim 1, further comprising:
   wherein the object is a pickable object.

24. A computing system including a processor and memory configured to perform operations comprising:
   training one or more apprentice machine learning models to perform at least a portion of a robotic task of a physical robotic system by monitoring a model-based control algorithm associated with the physical robotic system perform at least a portion of the robotic task;
   defining, via the one or more apprentice machine learning models, one or more robotic task predictions based upon, at least in part, the training of the one or more apprentice machine learning models, wherein the task predictions are predictions regarding a physical state of the robotic system or environment;
   providing the one or more robotic task predictions to the model-based control algorithm associated with the physical robotic system; and
   performing, via the model-based control algorithm associated with the robotic system, the robotic task on the physical robotic system based upon, at least in part, the one or more robotic task predictions defined by the one or more apprentice machine learning models.

25. The computing system of claim 24, further comprising:
   wherein the environment comprises a pickable object.

* * * * *